April 12, 1955   V. GEORGEFF   2,706,026
CLUTCH AND BRAKE SYNCHRONIZING ASSEMBLY FOR PRESSES
Filed Sept. 30, 1949
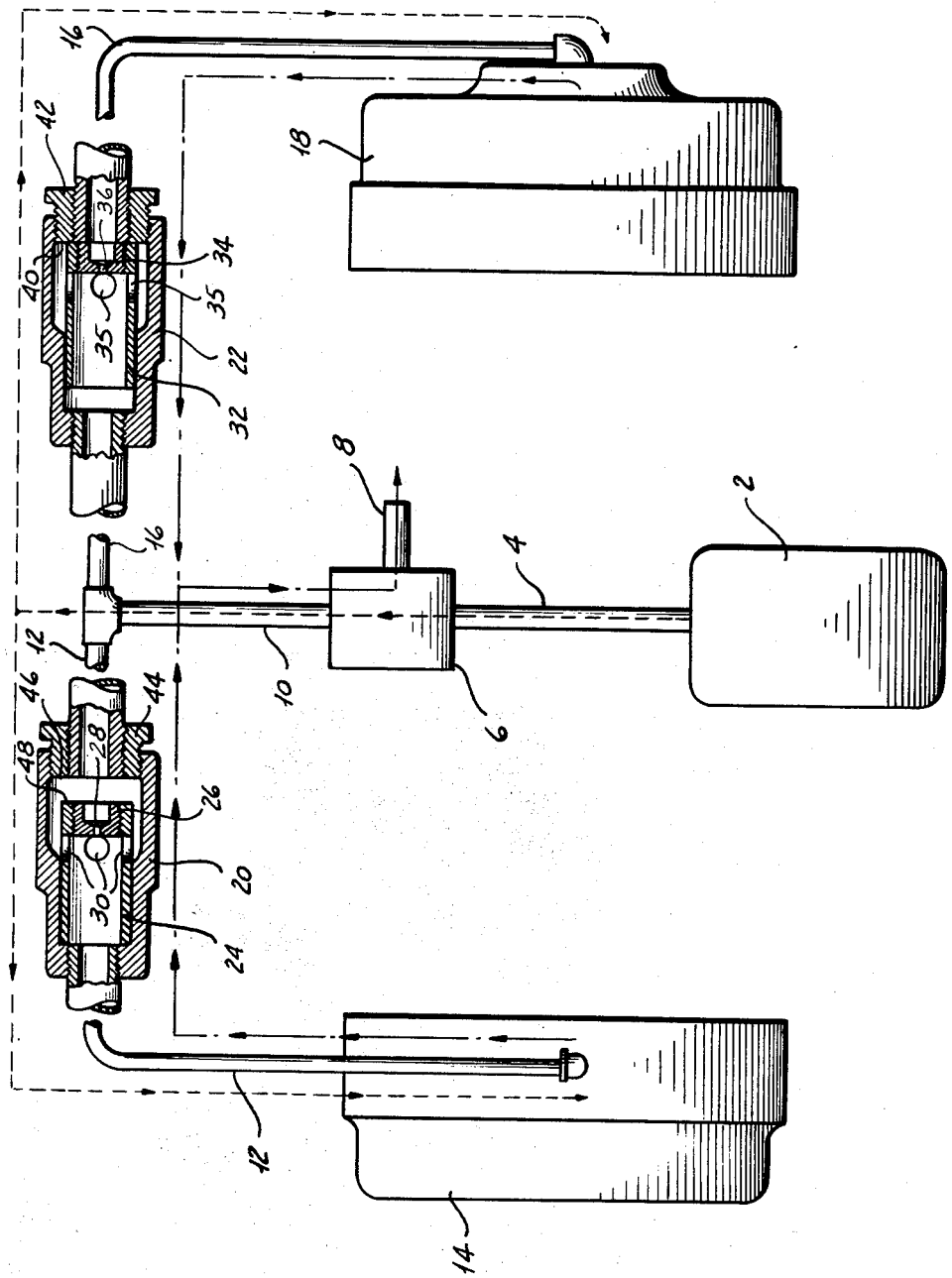
INVENTOR.
VASIL GEORGEFF
BY Henry L. Shenier
ATTORNEY

United States Patent Office 2,706,026
Patented Apr. 12, 1955

2,706,026

CLUTCH AND BRAKE SYNCHRONIZING ASSEMBLY FOR PRESSES

Vasil Georgeff, Chicago, Ill., assignor to Danly Machine Specialties, Inc., Chicago, Ill., a corporation of Illinois Application September 30, 1949, Serial No. 118,967

15 Claims. (Cl. 192—12)

My invention relates to a clutch and brake synchronizing assembly for presses, and more particularly for large power presses.

Power presses are heavy pieces of machinery requiring the performance of considerable work. The energy for this work is stored in a large and heavy flywheel which is constantly being driven from a prime mover such as an electric motor or the like. The press parts are normally immobilized by means of a brake. The working cycle is initiated by releasing the brake and substantially simultaneously clutching the flywheel to the working train of the press. The work is done through a comparatively small part of the cycle and the remainder of the cycle is used to again store energy in the flywheel. The certainty of operation of the press, therefore, depends upon its clutch and brake assembly which is in substantially continual use while the press is in operation.

A convenient way of operating the clutch and brake of a power press is by the use of a compressed gaseous medium such as air or the like. Most power presses of the prior art have a single air cylinder adapted to set the clutch together with mechanical means simultaneously releasing the brake. This requires a mechanical interconnection of a proper design and limits the location of the clutch with respect to the brake. Furthermore, the use of a mechanical interconnection limits the types of construction which may be used and requires comparatively large masses which have to be accelerated when the clutch is set and stopped when the brake is applied. Then too, the parts are relatively in accessible, which renders maintenance and adjustment difficult.

When it has been attempted to use a common air supply to be applied simultaneously to set the clutch and release the brake or, conversely, to release the clutch and set the brake, difficulties have been encountered. The air cylinders which operate the clutch and the brake are of necessity of different areas and are located at separated points. The clutch cylinder is usually of much larger area than the brake cylinder since the friction surface must be sufficiently large to overcome the inertia of all of the working train of the press. Furthermore, the brake is set by spring action and the brake springs are much heavier than the clutch springs. Accordingly, a higher fluid pressure is required to release the brake than is required to compress the relatively light clutch springs in setting the clutch. With a mechanical interconnection while the clutch is being set the brake is being released, and while the brake is being set the clutch is being released. That is to say the action is substantially simultaneous. During a small interval of time there is a tendency for the clutch to slip due to the fact that the brake has not been released during the operation of setting the clutch. Similarly, when the clutch is being released the brake has taken hold and there is a slight slippage of the brake lining due to the fact that the clutch is not yet released. The dragging of the clutch and the brake produces heat which softens the lining material so that the wear incident to the dragging is greatly increased. To eliminate this condition it is desirable to release the clutch an instant before the brake is set, and similarly, to release the brake slightly before the clutch engages. This will eliminate the tendency for the clutch to drag the brake when the clutch is being set and the tendency of the clutch dragging when the brake is being set. The adjustment of the synchronization of the setting of the clutch and brake with a mechanical interconnection is very limited and difficult of accomplishment.

In some infrequent cases a slight overlapping of the synchronization between the clutch and the brake action may be desired. It may be of advantage to have the clutch take hold before the brake is released and to have the brake set before the clutch is released. With my flexible synchronizing assembly this adjustment may be readily attained.

One object of my invention is to provide a clutch and brake assembly for presses in which the clutch is set by the application of air pressure to a clutch operating cylinder and released by the exhausting of the gaseous pressure, and in the same construction to provide a brake which is normally set by means of springs and released by means of an air cylinder to which air is supplied through a separate conduit and in which a common air supply may be used to supply compressed air to both the brake and the clutch operating cylinders.

A further object of my invention is to provide a clutch and brake having separate air cylinders in which the operation of the clutch and brake by means of compressed air from a common source of supply is synchronized in any desired manner.

Another object of my invention is to provide a clutch and brake synchronizing assembly for power presses which is flexible in design and in which I may adjust the synchronization to achieve a condition in which the brake is released slightly before the clutch engages and in which the clutch is released slightly before the brake is set; a condition in which the brake is set simultaneously with the release of the clutch, and vice versa; or a condition in which the brake is set slightly after the clutch is released, and vice versa.

Another object of my invention is to provide a clutch and brake assembly for power presses enabling me to place the brake in any desired position with respect to the clutch, giving me freedom of design in the construction of power presses.

Another object of my invention is to provide a clutch and brake synchronizing assembly for power presses enabling me to use clutch and brake constructions so designed and so positioned as to be readily accessible for maintenance or for adjustment.

Other and further objects of my invention will appear from the following description.

In general, my invention contemplates the provision of an air operated clutch and an air operated brake, each supplied through conduits from a common air supply by means of a three-way air valve adapted to place both the clutch and brake in communication with the compressed air supply, or to block the air supply and simultaneously place both the clutch and brake cylinders in communication with an exhaust. The individual lines leading from the air manifold to the brake air cylinder and the clutch air cylinder are provided with a valve arrangement so positioned and constructed that upon the application of air pressure the line to the clutch is restricted and the line to the brake is open when it is desired to release the brake slightly before the clutch is set. The construction is such that when the three-way valve is open to exhaust the line from the brake cylinder to the exhaust is restricted and the line from the clutch cylinder to the exhaust is open so that the clutch will release slightly before the brake is set. The relative time elapsing before the brake is set after the clutch is released is subject to close adjustment by means of orifice plugs controlling the restriction. By the choice of proper plugs I am enabled to reduce this time so that the brake and clutch will set substantially simultaneously. Similarly, I may introduce a slight overlap due to the fact that the area of the clutch cylinder is normally much greater than the area of the brake cylinder. By the use of a larger orifice plug in the line controlling the application of air to the clutch cylinder I may easily achieve a condition in which the clutch is set slightly before the brake is released.

The accompanying drawing which forms part of the instant specification and which is to be read in conjunction therewith is a diagrammatic view showing my synchronizing assembly.

Referring now to the drawing, compressed air or any other suitable gaseous medium under pressure is stored in an air supply tank 2 discharging into a supply pipe 4 controlled by a three-way valve 6. The valve is adapted to close the exhaust opening 8 and place the air supply pipe 4 in communication with an air manifold 10 when in one position. In another position the valve is adapted to close the air supply pipe 4 and place the manifold 10 in communication with the exhaust 8. A branch pipe 12 is adapted to conduct air to the brake air cylinder forming part of the structure of the brake 14. The brake may be of any desired construction known to the art in which springs normally set the brake and the air cylinder is adapted to release the brake against the action of the springs, as is well known to the art. A branch pipe 16 is adapted to conduct air to the air cylinder of a clutch 18 of any desired construction in which springs normally release the clutch and an air cylinder is adapted to set the clutch against the action of the springs, which structure is well known to the art. A control valve housing 20 (drawn on an enlarged scale) is positioned in the air line 12 leading to the brake. A control valve housing 22 (drawn on an enlarged scale) is positioned in the branch line 16 leading to the clutch. The dotted lines in the drawing show the direction of flow of the compressed air upon the application of the air supply to the clutch and brake cylinders. The line composed of dots and dashes indicates the direction of flow of the air when being exhausted from the clutch and brake cylinders. The housing 20 contains a sliding member 24 carrying a plug 26 provided with an orifice 28. The sliding member 24 is provided with a plurality of openings 30 of comparatively large size equal to or exceeding the cross-sectional area of the pipe 12. When the sliding member is in position shown in the drawing, the orifice 28 of plug 26 does not operate to restrict the flow of air to the brake cylinder since the openings 30 are in free communication with the air manifold 10.

The housing 22 carries a sliding member 32 in which is threadedly supported for easy removal a plug 34 provided with an orifice 36. The member 32 is formed with a plurality of openings 35, the aggregate area of which is in excess of the cross-sectional area of the pipe 16. When the member 32 is in the position shown in the drawing the air supply is restricted by reason of the fact that the member 34 is seated against the face 40 of the closure member 42 of the housing 22 constraining the air to flow through the orifice 36.

The housing 20 is closed by a closure member 44 formed with a seating surface 46 against which the surface 48 of the movable member 24 is adapted to seat when air is being exhausted from the brake cylinder, as will be pointed out hereinafter.

When the three-way valve 6 is in a position to connect the air supply pipe 4 to the air manifold 10, air will flow in the direction of the arrows indicated by the dotted lines. Since the plug 26 is restricted it acts as a piston and the air pressure will move the sliding member 24 to the left unseating surface 48 from surface 46. In this position the air flow to the brake air cylinder is unrestricted so that the brake will be released as soon as sufficient air pressure has been built up in the air cylinder to overcome the action of the springs. Assuming that we wish to ensure that the brake is released before the clutch is engaged, let us now trace the path of the air to the clutch operating air cylinder. The air moving to the right into housing 22 surges against the plug 34 and carries the member 32 to the right until it is seated against the seat 40 of the closure member 42. In this position the orifice 36 acts to throttle the flow of air through pipe 16 to the clutch operating air cylinder. The extent of the throttling is governed by the orifice 36. A plurality of plugs 34 are provided having different sized orifices 36 so that a very close control over the time of setting the clutch with respect to the release of the brake may be achieved. The smaller the orifice 36 the longer will be the time interval between the release of the brake and the setting of the clutch. It is possible by a proper sized orifice to reduce this time to zero and to have a simultaneous setting of the clutch with the release of the brake. By the use of a slightly increased orifice opening it is possible to introduce a slight overlap so that the clutch will be engaged just before the brake is released. It will be observed that what I have provided in effect is a throttling check valve. An ordinary check valve will stop the flow of air in one direction and permit free flow in another. In my throttling check valve I have free flow in one direction and restricted flow in the other direction.

When the three-way valve 6 is placed in the position to block the air supply 4 and open the manifold 10 to the exhaust 8, the compressed air in the clutch operating air cylinder will flow in the direction of the line formed by dots and dashes in the drawing, and the sliding member 32 will move off its seat and permit a rapid exhausting of the air from the air cylinder of the clutch, thus permitting a rapid release of the clutch. The compressed air in the air operating cylinder of the brake mechanism will flow to the right through housing 20 in exhausting and the surge of the air flow will seat the valve surface 48 of the member 24 against its seat 46, thus constraining the exhausting air to flow through the orifice plug 26. This delays the time of the setting of the brake to ensure that it will not be set before the clutch is released. The time interval between the releasing of the clutch and the setting of the brake is governed by the size of the orifice 28 in the plug 26. A small orifice 28 will introduce a comparatively long delay between the release of the clutch and the setting of the brake. A plurality of plugs 26 are provided with increasingly greater sized orifices 28. A larger orifice 28 will reduce the period between the release of the clutch and the setting of the brake. An orifice of the proper size will provide a synchronization in which the brake is set simultaneously with the release of the clutch. An orifice larger than this will introduce an overlap so that the brake will be set slightly before the clutch is released.

The housing 20 encloses a throttling check valve adapted to permit free flow of the air to the brake air cylinder and throttling the flowing of the air away from the brake operating air cylinder.

It will be seen that I have accomplished the objects of my invention.

I have provided a clutch and brake synchronizing assembly for presses which avoids mechanical interconnecting means and enables me to use separate air conduits from a manifold to the brake operating cylinder and to the clutch operating cylinder. I am not limited in the location of my clutch and brake structures since conduits can be led to them irrespective of where they are positioned, thus enabling me to have freedom in the design of my clutch and brake structures. I have avoided the use of large masses for the clutch and brake structures which have to be accelerated and stopped. I may place my brake and clutch structures in positions for accessibility, for ease in maintenance and adjustment. My synchronizing assembly is quite flexible and permits me to make any adjustment of the relative times between the setting of the clutch and brake within usable limits. My construction is inexpensive, simple in design and certain in its operation.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A power press including in combination a fluid pressure operated clutch, an independent fluid pressure operated brake, a source of fluid pressure, common means providing communication between the source of fluid pressure and said brake and clutch, a valve interposed in said common means for placing said fluid pressure source in communication with both said brake and clutch when the valve is in one position and for placing the brake and clutch in communication with an exhaust when the valve is in another position, said communicating means including a branch line providing communication with the clutch structure and a branch line providing communication with the brake structure, a throttling check valve interposed in the brake branch line, a throttling check valve interposed in the clutch branch line, the throttling check valve in the brake branch line including means for permitting unrestricted flow of the fluid pressure medium to the brake and means for restricting the flow of the fluid pressure medium from the brake, the throttling check valve in the clutch branch line including means for restricting the flow of the fluid pressure medium to the clutch and means for permitting free flow of the fluid pressure medium from the clutch in exhausting.

2. A power press as in claim 1 in which said throttling check valves each comprise a housing, a piston slidably carried in said housing, an orificed plug carried by said piston, said piston being formed with an opening by-passing said orificed plug, a seat for said piston, the construction being such that when said piston is on its seat fluid pressure will be constrained to flow through the orifice in the plug and when said piston is off its seat fluid may flow through the by-passing opening.

3. A power press as in claim 1 in which each of said throttling check valves comprises a housing formed with a cylinder, a hollow piston having a skirt slidably positioned in said cylinder, said housing being formed with a portion of an enlarged cross-sectional area adjacent one end thereof, a closure for said housing adjacent the enlarged end forming a seat, an orificed plug carried by said piston adjacent said portion of enlarged cross-sectional area, said piston being formed with a by-passing opening providing communication between the housing portion of enlarged cross-sectional area and the interior of the piston, means for introducing a fluid medium into said housing through said closure, means for introducing a fluid medium into said housing cylinder, the construction being such that when a fluid medium is introduced through the closure end the piston will be moved from its seat to permit the fluid to flow through the by-passing opening and when fluid is introduced into the cylinder the piston will be forced upon its seat to constrain the fluid medium to flow through the orifice of the orificed plug.

4. A power press including in combination a fluid pressure operated clutch, a fluid pressure operated brake spaced from said clutch and adapted to be operated by fluid independently of the clutch, a source of fluid under pressure, means providing communication between said source and the brake and between said source and the clutch, said means comprising a manifold and a pair of branch ducts, means for simultaneously placing the source in communication with both the clutch and brake, means for simultaneously placing both the clutch and brake in communication with an exhaust, means for restricting the flow of fluid under pressure to the clutch while permitting free flow of exhausting fluid from the clutch, and means for restricting the flow of fluid from the brake while permitting free flow of fluid to the brake.

5. A power press as in claim 4 in which said means for restricting flow of fluid comprises a throttling check valve.

6. A power press as in claim 4 in which said means for restricting the flow of fluid comprises a throttling check valve in which the throttling means includes an apertured plug and readily releasable means for removing the apertured plug to enable it to be replaced by a plug having a different aperture.

7. A power press as in claim 4 in which said means for restricting the flow of fluid comprises a throttling check valve including a housing, a piston movably positioned in said housing, said piston being formed by an apertured plug.

8. A power press as in claim 4 in which said means for restricting the flow of fluid to the clutch while permitting the free flow of fluid exhausting therefrom comprises a throttling check valve including a housing, a piston slidably positioned in said housing and adapted to seat against one end wall thereof, an apertured plug forming the piston head, said piston being formed with a skirt, said skirt being provided with a by-passing opening adapted to by-pass the apertured plug whenever the piston is unseated from a wall of the housing.

9. A power press as in claim 4 in which said means for restricting the flow of fluid from the brake to the exhaust while permitting free flow of fluid to the brake comprises a throttling check valve including a housing, a piston slidably positioned in said housing and adapted to seat against one end wall thereof, an apertured plug forming the piston head, said piston being formed with a skirt, said skirt being provided with a by-passing opening adapted to by-pass the apertured plug whenever the piston is unseated from a wall of the housing.

10. A power press including in combination a compressed air operated clutch, a compressed air operated brake spaced from said clutch and adapted to be operated by air independently of the clutch, a source of compressed air, means providing communication between said compressed air source and the brake and between said compressed air source and the clutch, said means comprising a manifold and a pair of branch ducts, means for simultaneously placing the compressed air source in communication with both the clutch and brake, means for simultaneously placing both the clutch and brake in communication with an exhaust, and means for restricting the flow of air to the clutch while permitting free flow of exhausting air from the clutch.

11. A power press as in claim 10 in which said means for restricting flow of air comprises a throttling check valve.

12. A power press as in claim 10 in which said means for restricting the flow of air comprises a throttling check valve in which the throttling means includes an apertured plug and readily releasable means for removing the apertured plug to enable it to be replaced by a plug having a different aperture.

13. A power press as in claim 10 in which said means for restricting the flow of air comprises a throttling check valve including a housing, a piston slidably positioned in said housing, said piston being formed with an apertured plug.

14. A power press as in claim 10 in which said means for restricting the flow of air to the clutch while permitting the free flow of air exhausting therefrom comprises a throttling check valve including a housing, a piston slidably positioned in said housing and adapted to seat against one wall thereof, an apertured plug forming the piston head, said piston being formed with a skirt, said skirt being provided with a by-passing opening adapted to by-pass the apertured plug whenever the piston is unseated from a wall of the housing.

15. A power press including in combination a compressed air operated clutch, a compressed air operated brake spaced from said clutch and adapted to be operated by air independently of the clutch, a source of compressed air, means providing communication between said compressed air source and the brake and between said compressed air source and the clutch, said means comprising a manifold and a pair of branch ducts, means for simultaneously placing the compressed air source in communication with both the clutch and brake, means for simultaneously placing both the clutch and brake in communication with an exhaust, and means for restricting the flow of exhausting air from the brake while permitting free flow of compressed air to the brake.

References Cited in the file of this patent
UNITED STATES PATENTS

| Number | Name | Date |
|---|---|---|
| 1,566,111 | Miller | Dec. 15, 1925 |
| 1,869,085 | Williamson | July 26, 1932 |
| 1,979,488 | Perez | Nov. 6, 1934 |
| 2,023,597 | Klocke et al. | Dec. 10, 1935 |
| 2,193,880 | Peet | Mar. 19, 1940 |
| 2,210,227 | Williamson | Aug. 6, 1940 |
| 2,277,554 | McCoy | Mar. 24, 1942 |
| 2,483,239 | Sharpe | Sept. 27, 1949 |
| 2,506,008 | Arps | May 2, 1950 |